United States Patent
Jiang et al.

(10) Patent No.: US 10,643,054 B2
(45) Date of Patent: May 5, 2020

(54) METHOD AND DEVICE FOR IDENTITY VERIFICATION

(71) Applicant: Beijing Xiaomi Mobile Software Co., Ltd., Beijing (CN)

(72) Inventors: Zhongsheng Jiang, Beijing (CN); Guosheng Li, Beijing (CN); Chuanshun Ji, Beijing (CN)

(73) Assignee: Beijing Xiaomi Mobile Software Co, Ltd., Beijing (CN)

( * ) Notice: Subject to any disclaimer, the term of this patent is extended or adjusted under 35 U.S.C. 154(b) by 85 days.

(21) Appl. No.: 15/666,271

(22) Filed: Aug. 1, 2017

(65) Prior Publication Data

US 2018/0039819 A1 Feb. 8, 2018

(30) Foreign Application Priority Data

Aug. 2, 2016 (CN) .......................... 2016 1 0626167

(51) Int. Cl.
*G06K 9/00* (2006.01)
*G06F 21/32* (2013.01)
*H04L 29/06* (2006.01)

(52) U.S. Cl.
CPC ......... *G06K 9/00087* (2013.01); *G06F 21/32* (2013.01); *G06K 9/00013* (2013.01); *G06K 9/00067* (2013.01); *H04L 63/0861* (2013.01); *H04L 63/105* (2013.01); *G06F 2221/2113* (2013.01)

(58) Field of Classification Search
None
See application file for complete search history.

(56) References Cited

U.S. PATENT DOCUMENTS

| | | | | |
|---|---|---|---|---|
| 2001/0026632 A1* | 10/2001 | Tamai | ...................... | G06K 9/00 382/116 |
| 2004/0192442 A1* | 9/2004 | Wells | ................. | G07C 9/00158 463/36 |
| 2015/0067827 A1* | 3/2015 | Lim | ........................ | G06F 21/32 726/19 |

(Continued)

FOREIGN PATENT DOCUMENTS

| CN | 104077516 A | 10/2014 |
|---|---|---|
| CN | 104143060 A | 11/2014 |

(Continued)

OTHER PUBLICATIONS

Extended European Search Report issued in European Patent Application No. 17184521.7, mailed from the European Patent Office, dated Dec. 12, 2017.

(Continued)

*Primary Examiner* — Hadi Akhavannik (74) *Attorney, Agent, or Firm* — Finnegan, Henderson, Farabow, Garrett & Dunner, L.L.P.

(57) ABSTRACT

A method for identity verification is provided. The method includes: collecting a target fingerprint for the identity verification; acquiring a fingerprint verification rule corresponding to a security level of the identity verification; performing a verification of the target fingerprint based on the fingerprint verification rule; and confirming that the identity verification is successful when the target fingerprint is verified.

13 Claims, 9 Drawing Sheets

(56) References Cited

U.S. PATENT DOCUMENTS

| | | | | |
|---|---|---|---|---|
| 2015/0161837 A1* | 6/2015 | Smith | ................ | G07C 9/00158 |
| | | | | 340/5.53 |
| 2015/0186710 A1* | 7/2015 | Ahn | ................... | G06K 9/00087 |
| | | | | 382/124 |
| 2015/0319294 A1 | 11/2015 | Sudhir | | |
| 2015/0347857 A1* | 12/2015 | Li | ............................ | G06K 9/00 |
| | | | | 382/116 |
| 2017/0053149 A1* | 2/2017 | Jiang | ....................... | G06F 21/32 |

FOREIGN PATENT DOCUMENTS

| | | | |
|---|---|---|---|
| EP | 1265121 | A2 | 12/2002 |
| EP | 2892002 | A2 | 7/2015 |

OTHER PUBLICATIONS

Chinese Office Action dated Jul. 4, 2018, in counterpart Chinese Application No. 201610626167.8.

Second Office Action issued by the State Intellectual Property Office (SIPO) of the People's Republic of China (PRC) dated Mar. 14, 2019, in counterpart Chinese Patent Application No. 201610626167.8.

European Office Action dated Mar. 6, 2019, in counterpart EP Application No. 17 184 521.7-1213.

* cited by examiner

METHOD AND DEVICE FOR IDENTITY VERIFICATION

CROSS-REFERENCE TO RELATED APPLICATION

The present application is based on and claims the priority of Chinese Patent Application No. 201610626167.8, filed on Aug. 2, 2016, the entire content of which is incorporated herein by reference.

TECHNICAL FIELD

The present disclosure generally relates to the field of terminal technology, and more particularly, to a method and a device for identity verification.

BACKGROUND

With the rapid development of terminal technology, more and more terminals support a fingerprint recognition function (such as unlocking by fingerprint recognition). Conventionally, terminals realize the fingerprint recognition function using a physical button in combination with a fingerprint recognition sensor.

Figure 1:
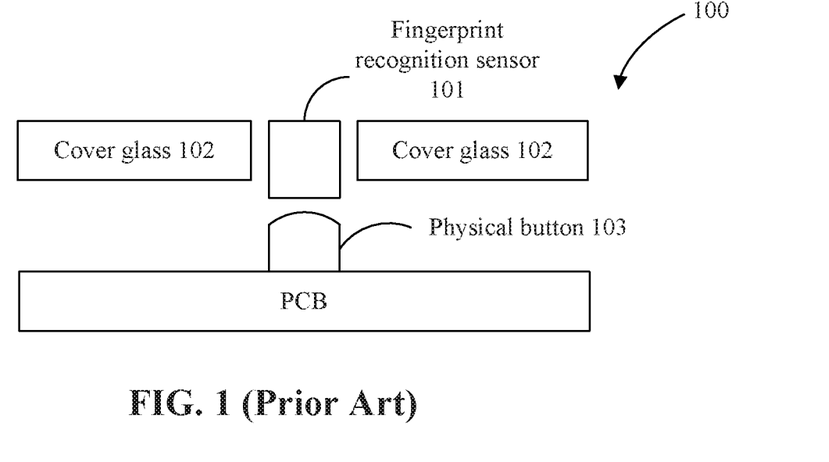
FIG. 1 is a cross-sectional view of a terminal configured with a fingerprint recognition sensor in prior art.

FIG. 1 is a cross-sectional view of a terminal 100 configured with a fingerprint recognition sensor in prior art. Referring to FIG. 1, to realize the fingerprint recognition function, a region for installing a fingerprint recognition sensor 101 is arranged in cover glass 102, and a physical button 103 is located below the fingerprint recognition sensor 101. When the press force with which a user presses the fingerprint recognition sensor 101 reaches a certain value, the physical button 103 may be triggered simultaneously.

In conventional technologies for fingerprint recognition, the user may only need to slightly touch the fingerprint recognition sensor for recording a fingerprint. However, for unlocking, the user usually needs to press the fingerprint recognition sensor relatively hard so as to trigger the physical button, and in this case, the fingerprint recognition sensor may be in a motion state, which may cause the force applied to the fingerprint recognition sensor uneven and make the collected fingerprint unclear, thus affecting the precision of the fingerprint recognition and affecting the user experience.

SUMMARY

According to a first aspect of the present disclosure, a method for identity verification is provided. The method includes: collecting a target fingerprint for the identity verification; acquiring a fingerprint verification rule corresponding to a security level of the identity verification; performing a verification of the target fingerprint based on the fingerprint verification rule; and confirming that the identity verification is successful when the target fingerprint is verified.

According to a second aspect of the present disclosure, a device for identity verification is provided. The device includes: a processor; and a memory storing instructions executable by the processor. The processor is configured to: collect a target fingerprint for the identity verification; acquire a fingerprint verification rule corresponding to a security level of the identity verification; perform a verification of the target fingerprint according to the fingerprint verification rule; and confirm that the identity verification is successful when the target fingerprint is verified.

According to a third aspect of the present disclosure, a non-transitory computer-readable storage medium is provided. The storage medium has stored therein instructions that, when executed by a processor of a terminal, cause the terminal to perform a method for identity verification. The method includes: collecting a target fingerprint for the identity verification; acquiring a fingerprint verification rule corresponding to a security level of the identity verification; performing a verification of the target fingerprint based on the fingerprint verification rule; and confirming that the identity verification is successful when the target fingerprint is verified.

It is to be understood that both the foregoing general description and the following detailed description are exemplary only and are not restrictive of the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 2:
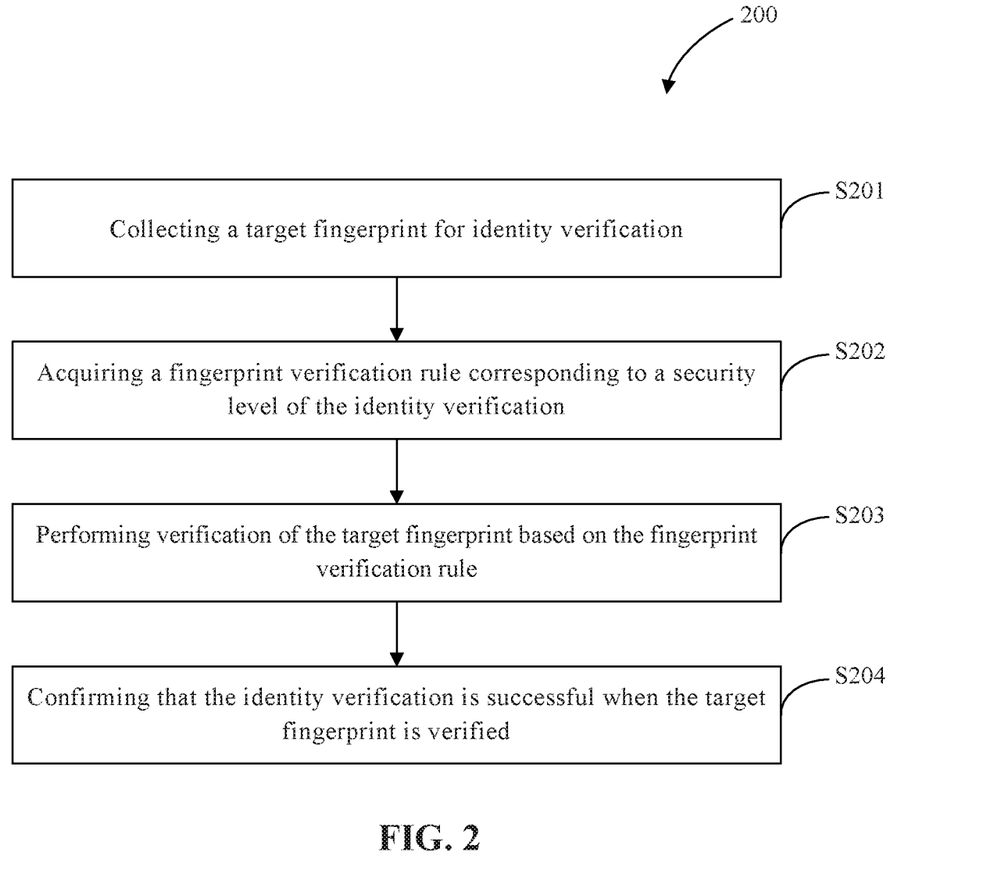
FIG. 2 is a flow chart of a method for identity verification according to an exemplary embodiment of the present disclosure.

FIG. 2 is a flow chart of a method 200 for identity verification according to an exemplary embodiment of the present disclosure. The method 200 may be applied in a terminal. The terminal may be a smart device such as a smartphone, a tablet PC, a personal digital assistant (PDA), and a PC. The method 200 may include following steps.

In step S201, a target fingerprint for identity verification is collected.

In this exemplary embodiment, the terminal may trigger a fingerprint recognition sensor to collect a fingerprint for identity verification when a preset system event is detected. The terminal may trigger the fingerprint recognition sensor to collect the fingerprint for identity verification when an identity verification instruction sent by an upper-level application is received, which is not limited in the present disclosure.

In this embodiment, the fingerprint for identity verification that is collected by the fingerprint recognition sensor is referred to as the target fingerprint.

In step S202, a fingerprint verification rule corresponding to a security level of the identity verification is acquired.

In this embodiment, the security level may be set by a user. The user may set different security levels for identity verifications of different application scenes according to the user's requirements. For example, the user may set an identity verification of an unlocking scene to have a lower security level, and set an identity verification of a payment scene to have a higher security level, and so on.

In this embodiment, each security level has a corresponding fingerprint verification rule. The fingerprint verification rule may include a verifying threshold configured to verify whether the target fingerprint matches a legal fingerprint. The verifying threshold may be set by a developer. For example, the developer may set a higher verifying threshold for a higher security level, and set a lower verifying threshold for a lower security level, which is not limited in the present application.

In step S203, verification of the target fingerprint is performed based on the fingerprint verification rule.

In step S204, it is confirmed that the identity verification is successful when the target fingerprint is verified.

In the method 200, the terminal may perform verification of the target fingerprint according to the fingerprint verification rule corresponding to the security level of identity verification, and confirm that the identity verification is successful after the target fingerprint is verified. In the present disclosure, by distinguishing security levels of identity verifications, the precision of fingerprint recognition may be improved while ensuring the security, thus improving the user experience.

Figure 3:
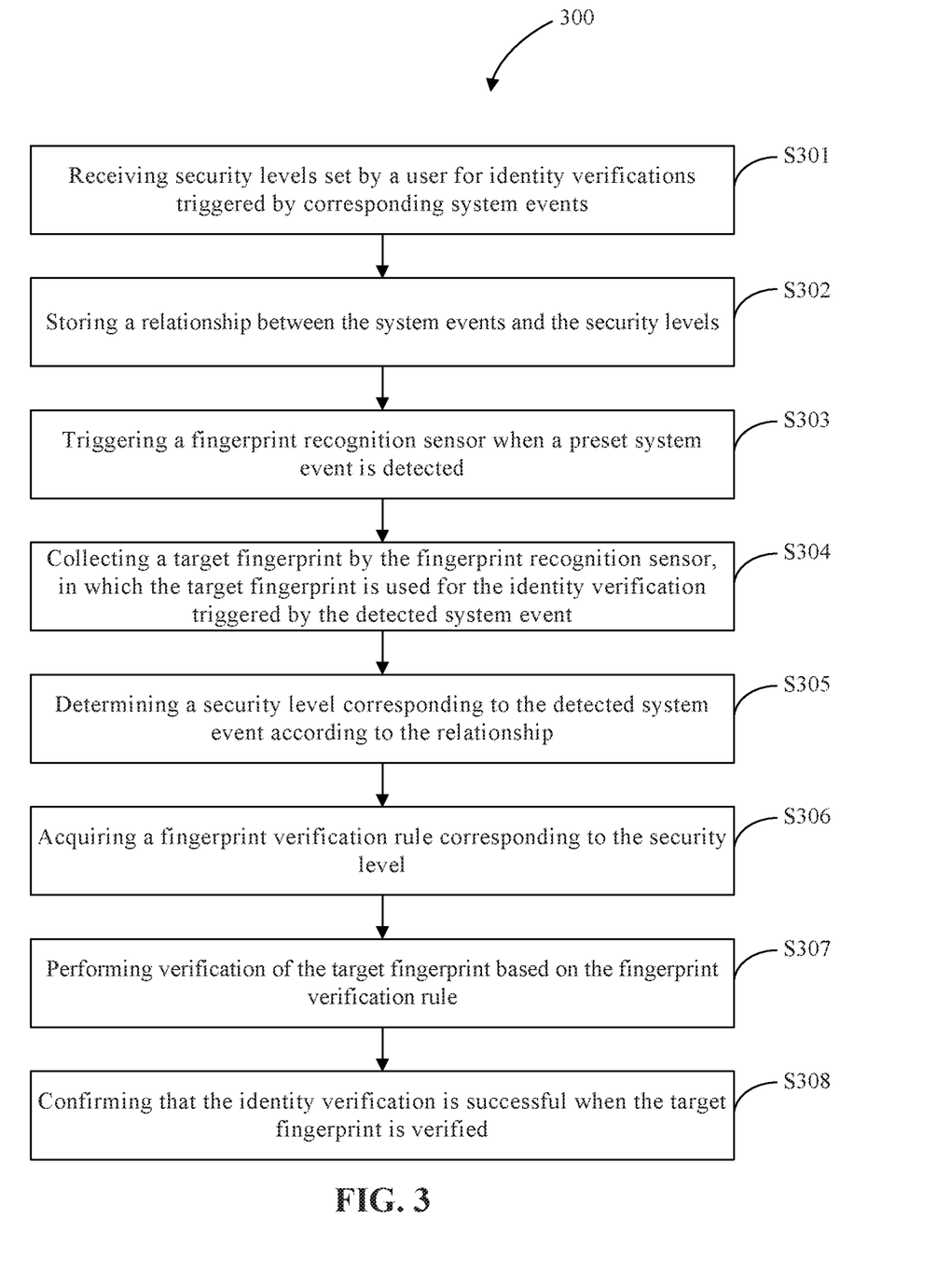
FIG. 3 is a flow chart of a method for identity verification according to another exemplary embodiment of the present disclosure.

FIG. 3 is a flow chart of a method 300 for identity verification according to another exemplary embodiment of the present disclosure. The method 300 may be applied in a terminal, and may include the following steps.

In step S301, security levels set by a user for identity verifications triggered by corresponding system events is received.

In this embodiment, system events triggering identity verifications may be set by a developer of the system. The system events may include events, such as a click on a home button in a screen-off state and a click on a power button in a screen-off state. For example, different system events may trigger identity verifications having the same function, and may also trigger identity verifications having different functions. For example, a click on a home button in a screen-off state and a click on a power button in a screen-off state may trigger a system unlocking identity verification, while a double-click on the home button in the screen-off state may trigger a system payment identity verification etc.

In this embodiment, the user may preset security levels for identity verifications triggered by corresponding system events. In some embodiments, a developer may preset several security levels for the user to choose from. For example, the developer presets three security levels, which include a high security level, a medium security level, and a low security level. Then the user may set different security levels for the system unlocking identity verification and the system payment identity verification triggered by the corresponding system events. For example, as shown in Table 1, the user may set a medium security level for the system unlocking identity verification, and set a high security level for the system payment identity verification.

TABLE 1

| Identity verification | Security level |
| --- | --- |
| System unlocking identity verification | Medium security level |
| System payment identity verification | High security level |

In step S302, a relationship between the system events and the security levels is stored.

In this embodiment, a relationship between the security levels and system events triggering the identity verifications may be stored after the security levels set by the user is received, as shown in Table 2.

TABLE 2

| System event | Security level |
| --- | --- |
| A click on a home button in a screen-off state | Medium security level |
| A click on a power button in a screen-off state | |
| A double-click on a home button in a screen-off state | High security level |

The relationship shown in Table 2 is generated based on Table 1, and may be stored. It should be noted that, Table 2 is merely for an exemplary illustration, and such a table may also not be stored in practical applications, which is not limited in the present disclosure.

In step S303, a fingerprint recognition sensor is triggered when a preset system event is detected.

In this embodiment, in order to reduce the system cost and prevent incorrect judgments, the fingerprint recognition sensor configured in the terminal may be in a sleep state in a scene in which an identity verification is not required. The terminal may trigger the fingerprint recognition sensor when a system event for identity verification is detected, thus collecting a target fingerprint.

For example, the terminal may trigger the fingerprint recognition sensor when a click event on the power button is detected in a screen-off state. The terminal may also trigger the fingerprint recognition sensor when a double-click event on the home button is detected in a screen-off state.

In step S304, a target fingerprint is collected by the fingerprint recognition sensor, in which the target fingerprint is used for the identity verification triggered by the detected system event.

In this embodiment, after being triggered, the fingerprint recognition sensor may collect the target fingerprint inputted by the user, for example, may collect an image of the target fingerprint.

In step S305, a security level corresponding to the detected system event is determined according to the relationship between the system events and the security levels.

In this embodiment, after the system event is detected, the terminal may determine the security level corresponding to the detected system event according to the relationship stored in step S302.

For example, if the detected system event is a click on a power button in a screen-off state, then a security level corresponding to this system event (e.g., a medium security level) may be acquired. If the detected system event is a double-click on a home button in a screen-off state, then a security level corresponding to this system event (e.g., a high security level) may be acquired.

In step S306, a fingerprint verification rule corresponding to the security level is acquired.

After the security level is acquired, a fingerprint verification rule corresponding to the security level may be acquired. The fingerprint verification rule may also be set by a developer, and may include a verifying threshold. The verifying threshold is configured to verify whether the target fingerprint matches a legal fingerprint.

In step S307, verification of the target fingerprint is performed based on the fingerprint verification rule.

In this embodiment, after the target fingerprint is collected by the fingerprint recognition sensor and after the fingerprint verification rule is acquired, the verification of the target fingerprint may be performed based on the acquired fingerprint verification rule. If the target fingerprint is verified, step S308 may be executed. If the target fingerprint fails to be verified, it may be confirmed that the identity verification fails, and a prompt message is provided to the user.

Figure 4:
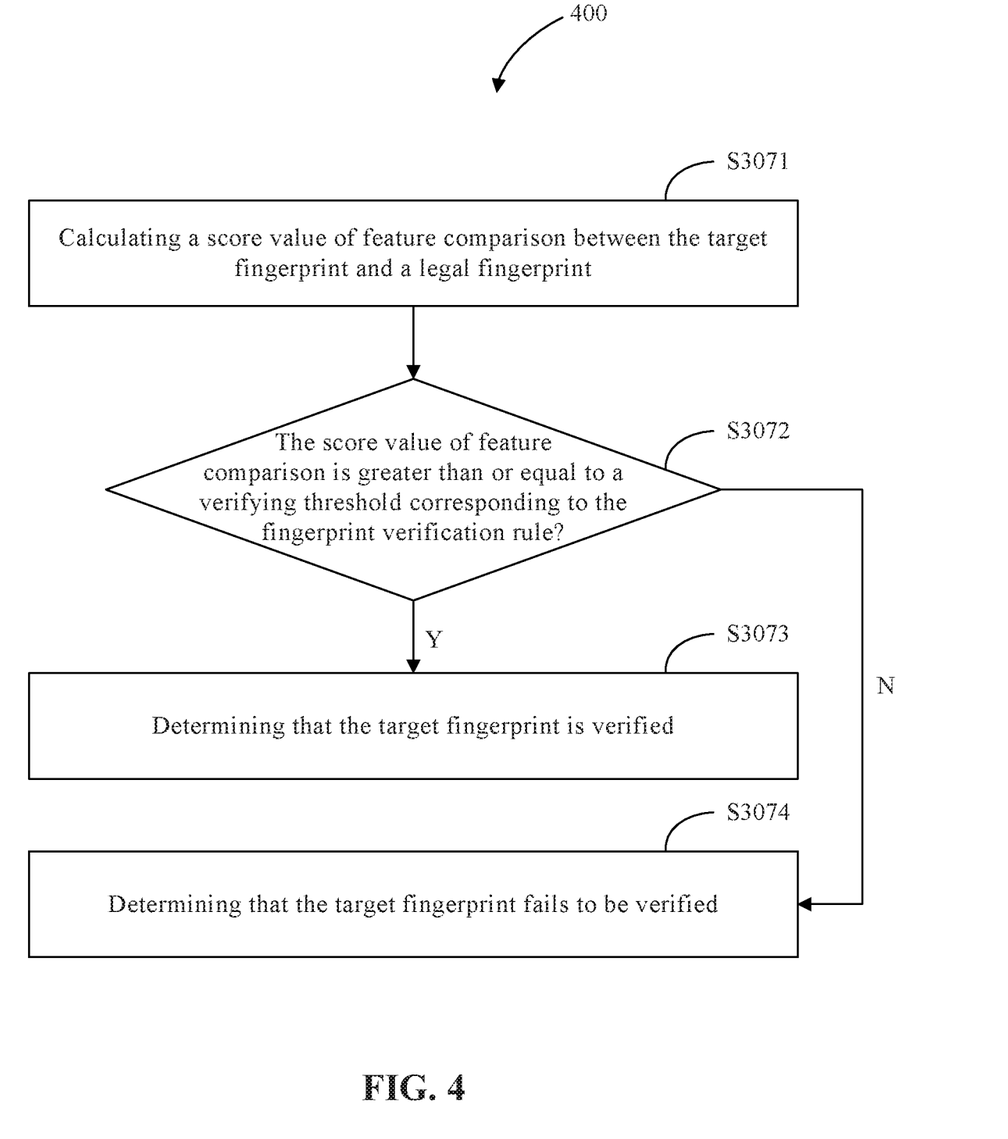
FIG. 4 is a flow chart of a method for verifying a target fingerprint according to an exemplary embodiment of the present disclosure.

FIG. 4 is a flow chart of a method 400 for verification of the target fingerprint, according to an exemplary embodiment. For example, the method 400 may be used to implement step 307 (FIG. 3).

In step S3071, a score value of feature comparison between the target fingerprint and a legal fingerprint is calculated.

In this embodiment, the legal fingerprint is inputted by an authorized user of the terminal in advance. For example, the user may input the legal fingerprint when the fingerprint recognition function of the terminal is turned on by, e.g., using methods known in related art.

In this embodiment, score values of feature comparisons between the target fingerprint and respective legal fingerprints may be calculated in order. For example, a similarity between a collected target fingerprint image and a legal fingerprint image may be calculated, and the similarity may be calculated using a perceptual hash algorithm and taken as the score value of feature comparison. In another example, a de-noising processing may first be performed on the collected target fingerprint image, and a fingerprint feature extraction may be performed on the de-noised target fingerprint image. The fingerprint feature of the target fingerprint image is referred to herein as a target fingerprint feature. Then a comparison score between the target fingerprint feature and a legal fingerprint feature of a legal fingerprint may be calculated. For example, comparison scores between the target fingerprint feature and the legal fingerprint in respective dimensions such as a spiral dimension and a sulcus dimension may be calculated, and comparison scores in the respective dimensions are summarized to obtain the score value of feature comparison.

In step S3072, it is judged whether the score value of feature comparison is greater than or equal to a verifying threshold corresponding to the fingerprint verification rule. If the score value of feature comparison is greater than or equal to the verifying threshold corresponding to the fingerprint verification rule, step S3073 may be executed. If the score value of feature comparison is less than the verifying threshold corresponding to the fingerprint verification rule, step S3074 may be executed.

After the score value of feature comparison between the target fingerprint and the legal fingerprint is calculated in step S3071, it may be judged whether the score value of feature comparison is greater than or equal to the verifying threshold corresponding to the fingerprint verification rule.

In this embodiment, the verifying threshold in a fingerprint verification rule corresponding to a high security level may be higher than the verifying threshold in a fingerprint verification rule corresponding to a low security level. That is, when a score value of feature comparison is determined, the passing rate of the target fingerprint in an identity verification scene having a high security level is lower than the passing rate of the target fingerprint in an identity verification scene having a low security level, thus improving the passing rate of fingerprint recognition in an identity verification scene having a low-security-level.

In step S3073, it is determined that the target fingerprint is verified.

On the basis of the judging result in step S3072, if the score value of feature comparison is greater than or equal to the verifying threshold corresponding to the fingerprint verification rule, it may be determined that the target fingerprint is verified.

In step S3074, it is determined that the target fingerprint fails to be verified.

On the basis of the judging result in step S3072, if the score value of feature comparison is less than the verifying threshold corresponding to the fingerprint verification rule, it may be determined that the target fingerprint fails to be verified.

For example, taking the user setting shown in Table 1 as an example, when the user clicks the home button in a screen-off state, in step S307 (FIG. 3), the terminal judges the score value of feature comparison according to a relatively lower verifying threshold corresponding to the medium security level, which significantly improves the passing rate of fingerprint recognition. When the user double-clicks the home button in a screen-off state, in step S307, the terminal judges the score value of feature comparison according to a relatively higher verifying threshold corresponding to the high security level, thus ensuring the security of identity verification for a high-risk payment scene.

Referring back to FIG. 3, in step S308, it is confirmed that the identity verification is successful when the target fingerprint is verified.

In this embodiment, when the target fingerprint is verified, it may be determined that the identity verification is successful. And then operations related to successful verification may be performed, such as unlocking a system, and completing a payment.

In the method 300, the user may set different security levels for various identity verifications triggered by the system events. For example, a security level for an unlocking identity verification may be set lower than that for a payment identity verification, which improves the passing rate of fingerprint recognition for a low-risk identity verification while ensuring the security of a high-risk identity verification, thus improving the user experience.

In some embodiments, the user may set different fingerprints for identity verifications for different identity verification scenes. Still taking Table 1 as an example, on the basis of the relationship between the identity verification scenes and the security levels shown in Table 1, the user sets an identity verification for accessing an address book. For example, this accessing identity verification is performed when the address book button is clicked. The user sets the security level for this accessing identity verification to be a medium security level, and sets this accessing identity verification only to be performed by verifying the right index finger. In this example, regarding the medium security level, the terminal may further establish another fingerprint verification rule corresponding to the medium security level based on the fingerprint verification rule corresponding to the medium security level, and sets a fingerprint identification for representing the right index finger in this fingerprint verification rule, as shown in Table 3.

It can be seen from the above descriptions that, on the basis of the above technical solution, the user may set fingerprint verification modes of different fingers for different identity verification scenes, which allows a high flexibility, and makes the user experience better.

Figure 5:
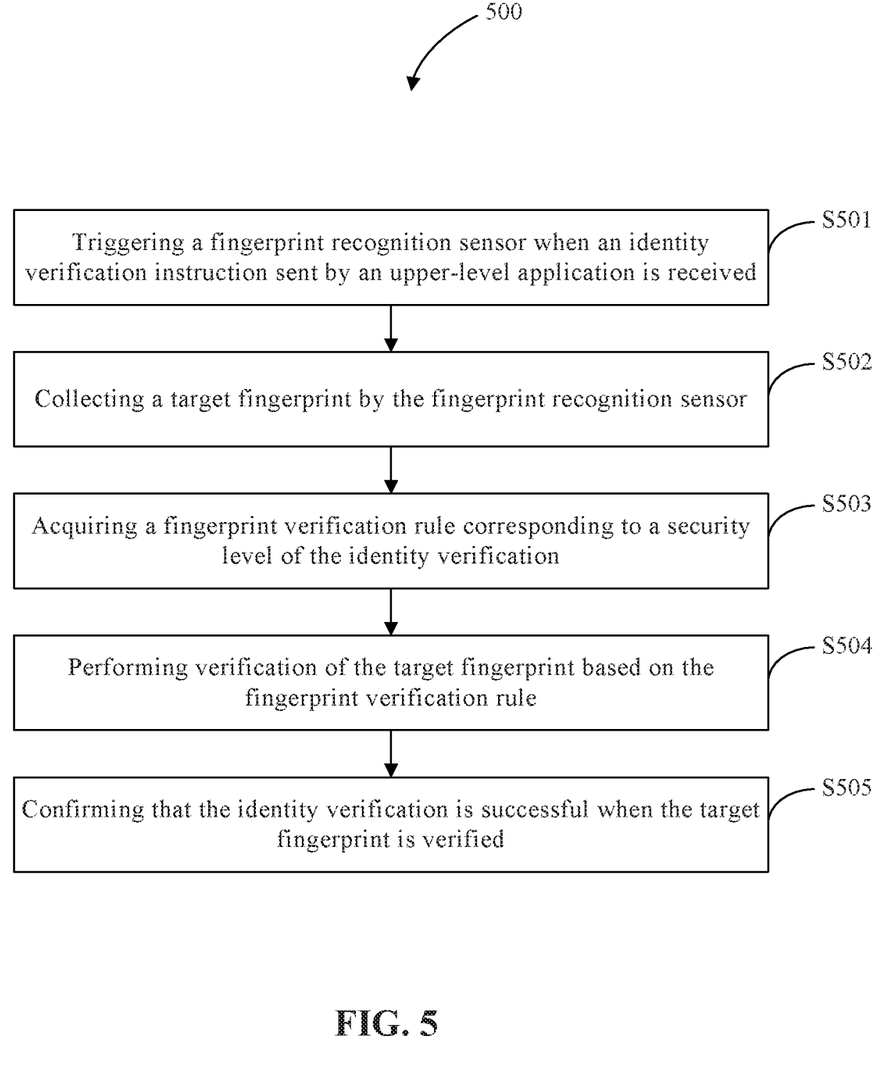
FIG. 5 is a flow chart of a method for identity verification according to yet another exemplary embodiment of the present disclosure.

FIG. 5 is a flow chart of a method 500 for identity verification according to another exemplary embodiment of the present disclosure. The method 500 may be applied in a terminal, and may include the following steps.

In step S501, a fingerprint recognition sensor is triggered when an identity verification instruction sent by an upper-level application is received.

In this embodiment, the upper-level application may be an application (APP) installed in the terminal, such as an Alipay client APP, and a WeChat client APP. Before invoking the fingerprint recognition sensor, the upper-level application may register in the system in advance so as to acquire a privilege to invoke components such as a fingerprint recognition sensor and a camera.

In this embodiment, the user may set different security levels for respective upper-level applications having an

TABLE 3

| Identity verification | System event | Security level | Fingerprint verification rule |
| --- | --- | --- | --- |
| System unlocking identity verification | A click on a home button in a screen off state<br>A click on a power button in a screen off state | Medium security level 1 | Fingerprint verification rule 1 |
| Accessing identity verification regarding the address book | A click on an address book button | Medium security level 2 | Fingerprint verification rule 2 |

Referring to Table 3, in order to be compatible with identity verification scenes for fingerprints of different fingers, the terminal may store a relationship between the system event "a click on an address book button" and the medium security level 2, and establish a fingerprint verification rule 2 for the medium security level 2. The fingerprint verification rule 2 includes a fingerprint identification of a right index finger, and the verifying threshold in the fingerprint verification rule 2 is equal to the verifying threshold in the original fingerprint verification rule 1.

In this example, when the user clicks the address book button, the fingerprint recognition sensor may be triggered to collect the target fingerprint, and acquire the fingerprint verification rule 2 corresponding to the medium security level 2. When verification of the collected target fingerprint is performed based on the fingerprint verification rule 2, it may be first judged whether the fingerprint verification rule 2 includes a fingerprint identification. If a fingerprint identification is included, the legal fingerprint indicated by the fingerprint identification may be determined. The score value of feature comparison between the target fingerprint and this legal fingerprint may then be calculated without calculating score values of feature comparisons between the target fingerprint and other legal fingerprints. In this example, this fingerprint identification points to the right index finger, such that the score value of feature comparison between the target fingerprint and a legal fingerprint of the right index finger may be calculated, and it is judged whether this score value of feature comparison is greater than or equal to the verifying threshold of the fingerprint verification rule 2.

identity verification function. For the same upper-level application, the user may also set different security levels for identity verifications in different application scenes.

For example, taking a payment APP A as an example, the payment APP A may perform an identity verification on the user at startup. The payment APP A may also perform an identity verification on the user when the user performs a payment operation and the like. The user may set the security level of identity verification for the unlocking scene of the payment APP A as a medium security level, and set the security level of identity verification for the payment scene of the payment APP A as a high security level.

In this embodiment, when the user triggers an identity verification operation for an upper-level APP, the upper-level APP may send an identity verification instruction to the terminal, and the identity verification instruction carries the security level of this identity verification. The terminal may trigger the fingerprint recognition sensor to collect a target fingerprint when the identity verification instruction is received.

Still taking the payment APP A as an example, when the user clicks on the icon of payment APP A, the payment APP A sends an identity verification instruction having a medium security level to the terminal. When the user performs a payment operation using the payment APP A, the payment APP A sends an identity verification instruction having a high security level to the terminal.

In step S502, a target fingerprint is collected by the fingerprint recognition sensor.

In step S503, a fingerprint verification rule corresponding to the security level of the identity verification is acquired.

On the basis of step S501, after receiving the identity verification instruction sent by the upper-level application, the terminal may acquire, from the stored relationship between the security levels and the fingerprint verification rules, a fingerprint verification rule corresponding to the security level carried in the identity verification instruction.

In step S504, verification of the target fingerprint is performed based on the fingerprint verification rule.

In step S505, it is confirmed that the identity verification is successful when the target fingerprint is verified.

In this step, when it is determined that the target fingerprint is verified, a message indicating that the verification is successful may be sent to the upper-level application. The upper-level application may further perform operations related to successful verification, such as displaying a home page message and completing a payment operation.

In another embodiment, if the target fingerprint fails to be verified, a message indicating that the verification fails may also be sent to the upper-level application The upper-level application may further perform operations related to the verification failing, such as displaying a message indicating a failure of verification.

In the method 500, the terminal may store the relationship between respective security levels and the fingerprint verification rules and perform verification of the target fingerprint by referring to the technical solution shown in FIG. 3, which will not be repeated here.

It can be seen from the above descriptions that, the user may set different security levels for different identity verifications of respective upper-level applications, such that the passing rate of fingerprint recognition for a low-risk operation is improved while ensuring the security of a high-risk operation, thus improving user experience.

Figure 6:
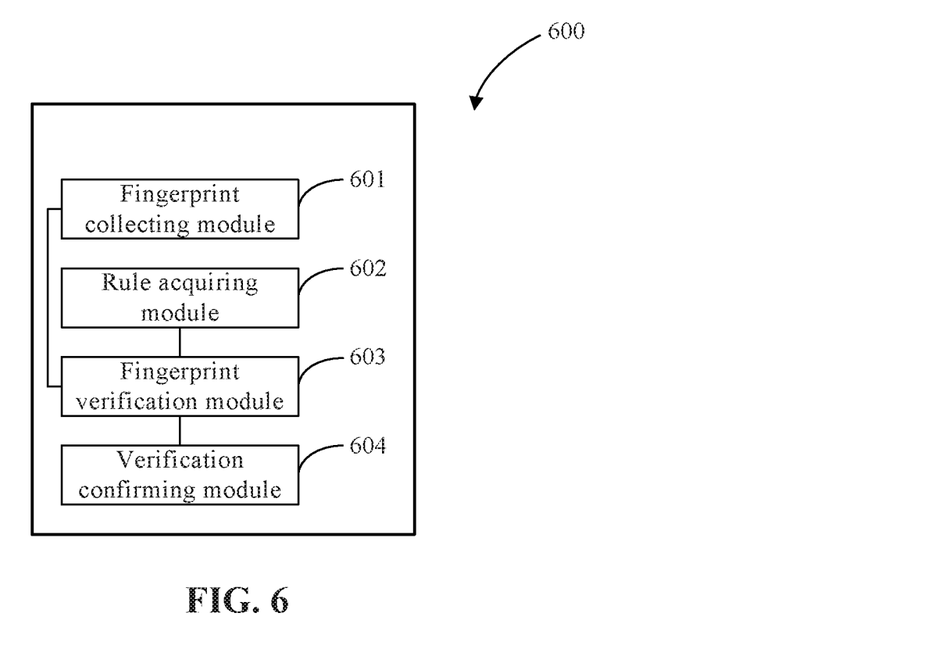
FIG. 6 is a block diagram of a device for identity verification according to an exemplary embodiment of the present disclosure.

FIG. 6 is a block diagram of a device 600 for identity verification according to an exemplary embodiment of the present disclosure.

Referring to FIG. 6, the device 600 may be applied in a terminal. The device 600 may include: a fingerprint collecting module 601, a rule acquiring module 602, a fingerprint verification module 603 and a verification confirming module 604.

The fingerprint collecting module 601 is configured to collect a target fingerprint for identity verification.

The rule acquiring module 602 is configured to acquire a fingerprint verification rule corresponding to a security level of the identity verification.

The fingerprint verification module 603 is configured to perform verification of the target fingerprint collected by the fingerprint collecting module 601 based on the fingerprint verification rule acquired by the rule acquiring module 602.

The verification confirming module 604 is configured to confirm that the identity verification is successful when the target fingerprint is verified by the fingerprint verification module 603.

In the exemplary embodiment, the terminal may perform verification of the target fingerprint based on the fingerprint verification rule corresponding to the security level of the current identity verification, and confirm that the identity verification is successful after the target fingerprint is verified. In the present disclosure, by distinguishing security levels of identity verifications, the precision of fingerprint recognition may be improved while ensuring the security, thus improving the user experience.

Figure 7:
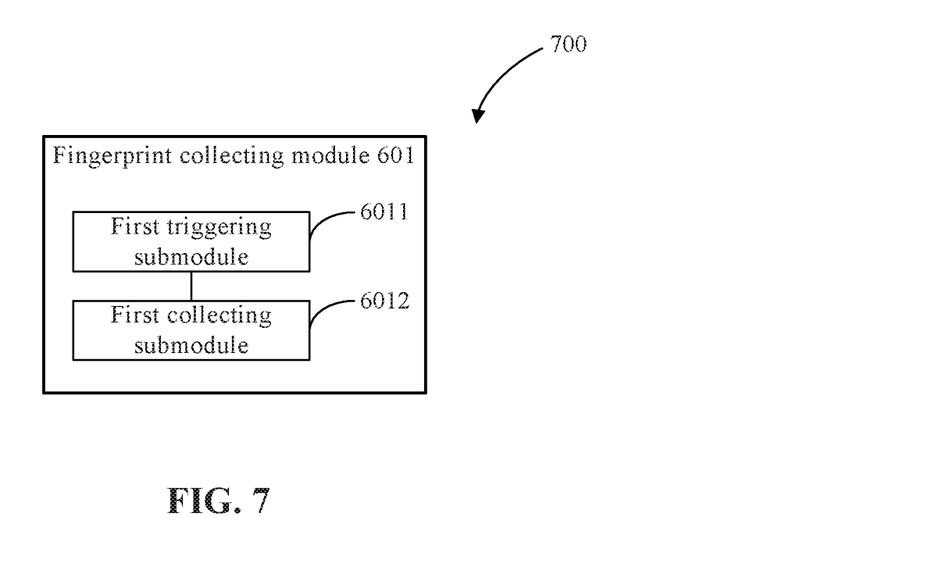
FIG. 7 is a block diagram of a device for identity verification according to another exemplary embodiment of the present disclosure.

FIG. 7 is a block diagram of a device 700 for identity verification according to an exemplary embodiment of the present disclosure. For example, the device 700 may be the fingerprint collecting module 601 (FIG. 6).

Referring to FIG. 7, the fingerprint collecting module 601 may include: a first triggering submodule 6011 and a first collecting submodule 6012.

The first triggering submodule 6011 is configured to trigger a fingerprint recognition sensor when a preset system event is detected.

The first collecting submodule 6012 is configured to collect the target fingerprint by the fingerprint recognition sensor triggered by the first triggering submodule 6011. The target fingerprint is used for the identity verification trigged by the system event.

Figure 8:
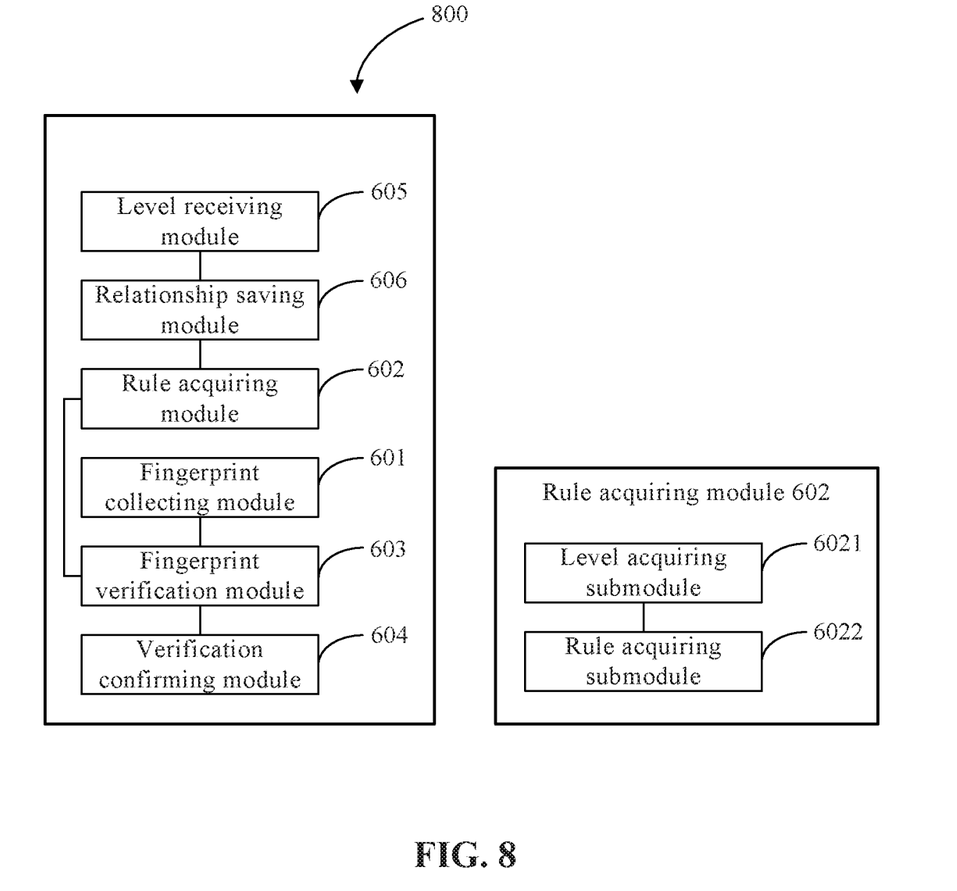
FIG. 8 is a block diagram of a device for identity verification according to yet another exemplary embodiment of the present disclosure.

FIG. 8 is a block diagram of a device 800 for identity verification according to an exemplary embodiment of the present disclosure.

Referring to FIG. 8, the device 800 may further include: a level receiving module 605 and a relationship saving module 606 in addition to the modules in the device 600 (FIG. 6). The rule acquiring module 602 may further include: a level acquiring submodule 6021 and a rule acquiring submodule 6022.

The level receiving module 605 is configured to receive security levels set by a user for the identity verifications triggered by respective system events.

The relationship saving module 606 is configured to store a relationship between the system events and the security levels received by the level receiving module 605.

The level acquiring submodule 6021 is configured to determine a security level corresponding to the detected system event according to the relationship stored by the relationship saving module 606.

The rule acquiring submodule 6022 is configured to acquire the fingerprint verification rule corresponding to the security level acquired by the level acquiring submodule 6021.

In the exemplary embodiment, the user may set different security levels for various identity verifications triggered by the system events. For example, a security level for an unlocking identity verification is set lower than that for a payment identity verification. As such, the passing rate of fingerprint recognition of a low-risk identity verification is improved while ensuring the security of a high-risk identity verification, thus improving the user experience.

Figure 9:
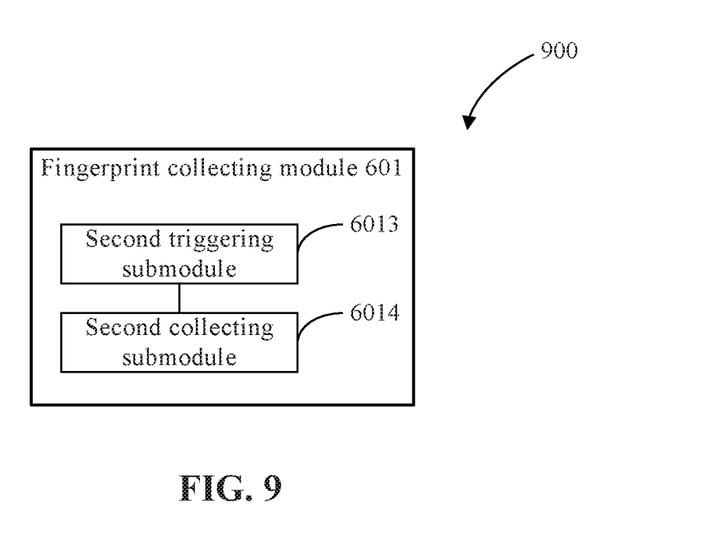
FIG. 9 is a block diagram of a device for identity verification according to still yet another exemplary embodiment of the present disclosure.

FIG. 9 is a block diagram of a device 900 for identity verification according to an exemplary embodiment of the present disclosure. For example, the device 900 may be the fingerprint collecting module 601 (FIG. 6).

Referring to FIG. 9, the fingerprint collecting module 601 may include: a second triggering submodule 6013 and a second collecting submodule 6014.

The second triggering submodule 6013 is configured to trigger a fingerprint recognition sensor when an identity verification instruction sent by an upper-level application is received. The identity verification instruction carries a security level of the identity verification.

The second collecting submodule 6014 is configured to acquire the target fingerprint by the fingerprint recognition sensor triggered by the second triggering submodule 6013.

Figure 10:
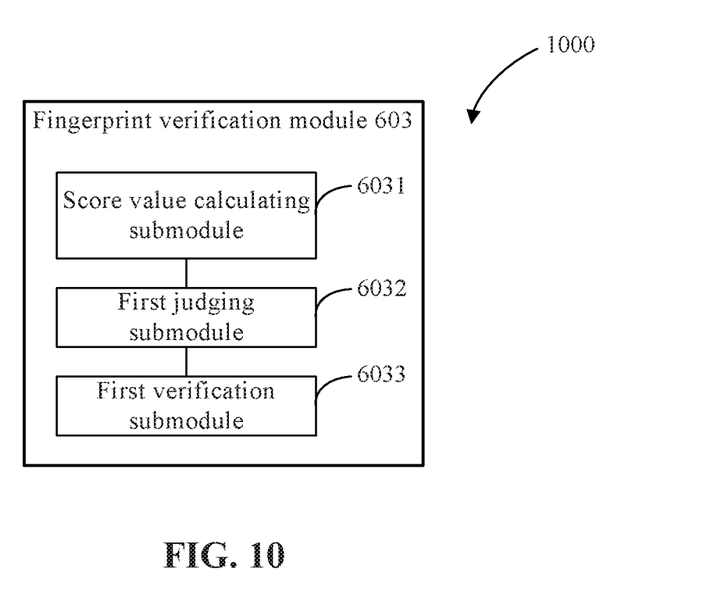
FIG. 10 is a block diagram of a device for identity verification according to still yet another exemplary embodiment of the present disclosure.

FIG. 10 is a block diagram of a device 1000 for identity verification according to an exemplary embodiment of the present disclosure. For example, the device 1000 may be the fingerprint verification module 603 (FIG. 6).

Referring to FIG. 10, the fingerprint verification module 603 may include: a score value calculating submodule 6031, a first judging submodule 6032 and a first verification submodule 6033.

The score value calculating submodule 6031 is configured to calculate a score value of feature comparison between the target fingerprint collected by the fingerprint collecting module 601 and a legal fingerprint.

The first judging submodule 6032 is configured to judge whether the score value of feature comparison calculated by the score value calculating submodule 6031 is greater than a verifying threshold corresponding to the fingerprint verification rule.

The first verification submodule 6033 is configured to determine that the target fingerprint is verified when the first judging submodule 6032 confirms that the score value of feature comparison is greater than the verifying threshold corresponding to the fingerprint verification rule.

It should be noted that, the score value calculating submodule 6031, the first judging submodule 6032 and the first verification submodule 6033 may also be applied in the embodiments shown in FIG. 7 to FIG. 9, which is not limited in the present disclosure.

Figure 11:
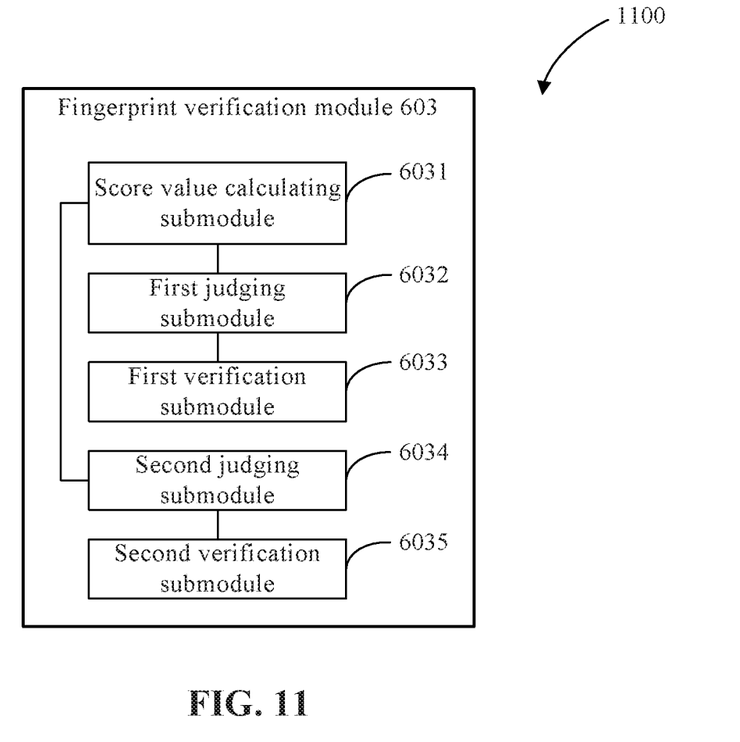
FIG. 11 is a block diagram of a device for identity verification according to still yet another exemplary embodiment of the present disclosure.

FIG. 11 is a block diagram of a device 1100 for identity verification according to an exemplary embodiment of the present disclosure. For example, the device 1100 may be the fingerprint verification module 603 (FIG. 6).

Referring to FIG. 11, the fingerprint verification module 603 may further include: a second judging submodule 6034 and a second verification submodule 6035.

The second judging submodule 6034 is configured to judge whether the score value of feature comparison calculated by the score value calculating submodule 6031 is equal to the verifying threshold corresponding to the fingerprint verification rule.

The second verification submodule 6035 is configured to determine the target fingerprint is verified when the second judging submodule 6034 confirms that the score value of feature comparison is equal to the verifying threshold corresponding to the fingerprint verification rule.

Figure 12:
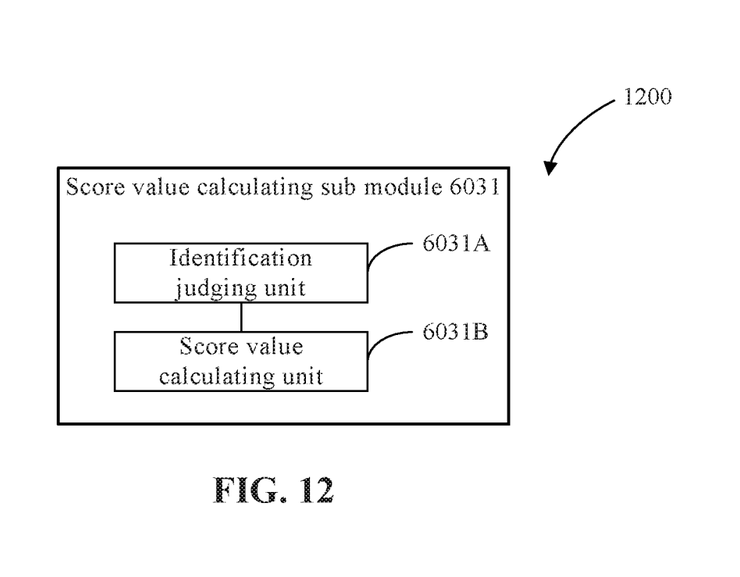
FIG. 12 is a block diagram of a device for identity verification according to still yet another exemplary embodiment of the present disclosure.

FIG. 12 is a block diagram of a device 1300 for identity verification according to an exemplary embodiment of the present disclosure. For example, the device 1300 may be the score value calculating submodule 6031 (FIG. 10).

Referring to FIG. 12, the score value calculating submodule 6031 may further include: an identification judging unit 6031A and a score value calculating unit 6031B.

The identification judging unit 6031A is configured to judge whether the fingerprint verification rule acquired by the rule acquiring module includes a fingerprint identification.

The score value calculating unit 6031B is configured to calculate the score value of feature comparison between the target fingerprint collected by the fingerprint collecting module 601 and a legal fingerprint corresponding to the fingerprint identification when the identification judging unit 6031A determines that the fingerprint verification rule includes the fingerprint identification.

Since device embodiments correspond to the method embodiments, for related parts, reference may be made to descriptions of the method embodiments. The above device embodiments are merely exemplary. Units described as separate components may be or may not be physically separated. Components shown as units may be or may not be physical units, for example, may be located at one position or may be distributed to a plurality of network units. Some or all of the modules may be selected according to actual requirements so as to achieve the objective of the present disclosure. Those skilled in the art may understand and implement the present disclosure without making creative efforts.

The present disclosure also provides an identity verification device, including: a processor; and a memory configured to store instructions executable by the processor. The processor is configured to: collect a target fingerprint for identity verification; acquire a fingerprint verification rule corresponding to a security level of the identity verification; perform verification of the target fingerprint based on the fingerprint verification rule; and confirm that the identity verification is successful when the target fingerprint is verified.

Figure 13:
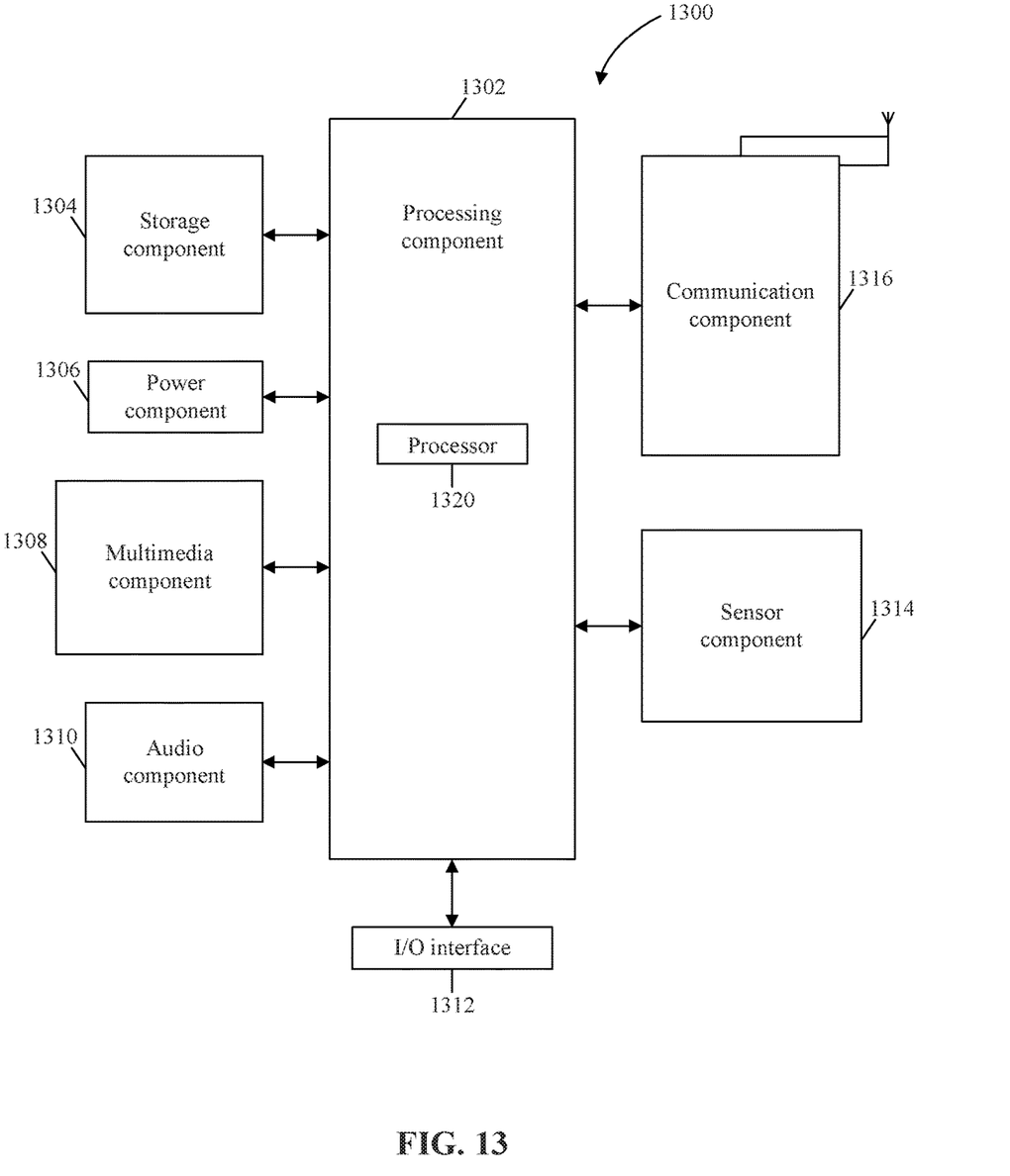
FIG. 13 is a schematic diagram of a device for identity verification according to an exemplary embodiment of the present disclosure.

FIG. 13 is a block diagram of an identity verification device 1300 according to an exemplary embodiment of the present disclosure. For example, the device 1300 may be a smartphone, a computer, a digital broadcasting terminal, a messaging apparatus, a game console, a tablet apparatus, a medical apparatus, a fitness apparatus, a personal digital assistant, etc.

Referring to FIG. 13, the device 1300 may include one or more of the following components: a processing component 1302, a storage component 1304, a power component 1306, a multimedia component 1308, an audio component 1310, an input/output (I/O) interface 1312, a sensor component 1314 and a communication component 1316.

The processing component 1302 typically controls overall operations of the device 1300, such as the operations associated with display, telephone calls, data communications, camera operations, and recording operations. The processing component 1302 may include one or more processors 1320 to execute instructions so as to perform all or part of the steps in the above described methods. Moreover, the processing component 1302 may include one or more modules which facilitate the interaction between the processing component 1302 and other components. For instance, the processing component 1302 may include a multimedia module to facilitate the interaction between the multimedia component 1308 and the processing component 1302.

The storage component 1304 is configured to store various types of data to support the operation of the device 1300. Examples of such data include instructions for any applications or methods operated on the device 1300, contact data, phonebook data, messages, pictures, videos, etc. The storage component 1304 may be implemented using any type of volatile or non-volatile memory device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 provides power to various components of the device 1300. The power component 1306 may include a power management system, one or more power sources, and any other components associated with the generation, management, and distribution of power in the device 1300.

The multimedia component 1308 includes a screen providing an output interface between the device 1300 and the user. In some embodiments, the screen may include a liquid crystal display (LCD) and a touch panel. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 1308 includes a front camera and/or a rear camera. The front camera and/or the rear camera may receive an external multimedia datum while the device 1300 is in an operation mode, such as a photographing mode or a video mode. Each of the front camera and the rear camera may be a fixed optical lens system or have focus and optical zoom capability.

The audio component 1310 is configured to output and/or input an audio signal. For example, the audio component 1310 includes a microphone ("MIC") configured to receive an external audio signal when the device 1300 is in an operation mode, such as a call mode, a recording mode, and a voice recognition mode. The received audio signal may be further stored in the storage component 1304 or transmitted via the communication component 1316. In some embodiments, the audio component 1310 further includes a speaker to output audio signals.

The I/O interface 1312 provides an interface between the processing component 1302 and peripheral interface modules, such as a keyboard, a single click wheel, buttons, and the like. The buttons may include, but are not limited to, a home button, a volume button, a starting button, and a locking button.

The sensor component 1314 includes one or more sensors to provide status assessments of various aspects of the device 1300. For instance, the sensor component 1314 may detect an opened/closed status of the device 1300, relative positioning of components (e.g., the display and the keypad) of the device 1300, a change in position of the device 1300 or a component of the device 1300, a presence or absence of user contact with the device 1300, an orientation or an acceleration/deceleration of the device 1300, and a change in temperature of the device 1300. The sensor component 1314 may include a proximity sensor configured to detect the presence of nearby objects without any physical contact. The sensor component 1314 may also include a light sensor, such as a CMOS or CCD image sensor, for use in imaging applications. In some embodiments, the sensor component 1314 may also include an accelerometer sensor, a gyroscope sensor, a magnetic sensor, a pressure sensor, or a temperature sensor.

The communication component 1316 is configured to facilitate wired or wireless communication between the device 1300 and other apparatus. The device 1300 can access a wireless network based on a communication standard, such as WiFi, 2G, 3G, or 4G, or a combination thereof. In one exemplary embodiment, the communication component 1316 receives a broadcast signal from an external broadcast management system via a broadcast channel or broadcast associated information. In one exemplary embodiment, the communication component 1316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1304, and executable by the processor 1320 of the device 1300, for performing the above-described methods. For example, the non-transitory computer-readable storage medium may be a ROM, a RAM (random access memory), a CD-ROM, a magnetic tape, a floppy disc, an optical data storage device, and the like.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may be further divided into a plurality of sub-modules.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for identity verification, comprising:
   collecting a target fingerprint of a user for the identity verification;
   acquiring a fingerprint verification rule corresponding to a security level of the identity verification;
   performing a verification of the target fingerprint based on the fingerprint verification rule, by comparing the target fingerprint with a corresponding legal fingerprint among a plurality of different legal fingerprints of the user, wherein each of the plurality of different legal fingerprints corresponds to a respective security level of the identity verification; and
   confirming that the identity verification is successful when the target fingerprint is verified,
   wherein collecting the target fingerprint comprises:
      triggering a fingerprint recognition sensor when an identity verification instruction sent by an upper-level application is received; and
      collecting the target fingerprint by the fingerprint recognition sensor,
   wherein the identity verification instruction carries the security level of the identity verification, and different security levels for different identify verifications in different application scenes exist for the same upper-level application within an operating system.

2. The method according to claim 1, wherein collecting the target fingerprint comprises:
   triggering a fingerprint recognition sensor when a preset system event is detected; and
   collecting the target fingerprint by the fingerprint recognition sensor, the target fingerprint being used for the identity verification triggered by the detected system event.

3. The method according to claim 2, further comprising:
   receiving security levels for identity verifications triggered by respective system events; storing a relationship between the system events and the security levels, wherein acquiring the fingerprint verification rule comprises:
determining the security level corresponding to the detected system event according to the relationship; and
acquiring the fingerprint verification rule corresponding to the security level.

4. The method according to claim 1, wherein performing the verification of the target fingerprint comprises:
calculating a score value of feature comparison between the target fingerprint and the corresponding legal fingerprint;
judging whether the score value is greater than a verifying threshold corresponding to the fingerprint verification rule; and
determining that the target fingerprint is verified if the score value is greater than the verifying threshold value.

5. The method according to claim 4, wherein performing the verification of the target fingerprint further comprises:
judging whether the score value is equal to the verifying threshold; and
determining that the target fingerprint is verified, if the score value is equal to the verifying threshold value.

6. The method according to claim 4, wherein calculating the score value of feature comparison comprises:
judging whether the fingerprint verification rule includes a fingerprint identification; and
calculating the score value between the target fingerprint and the legal fingerprint corresponding to the fingerprint identification, if the fingerprint verification rule includes the fingerprint identification.

7. A device for identity verification, comprising:
a processor; and
a memory storing instructions executable by the processor;
wherein the processor is configured to:
collect a target fingerprint of a user for the identity verification;
acquire a fingerprint verification rule corresponding to a security level of the identity verification;
perform a verification of the target fingerprint based on the fingerprint verification rule, by comparing the target fingerprint with a corresponding legal fingerprint among a plurality of different legal fingerprints of the user, wherein each of the plurality of different legal fingerprints corresponds to a respective security level of the identity verification; and
confirm that the identity verification is successful when the target fingerprint is verified,
wherein the processor is further configured to:
trigger a fingerprint recognition sensor when an identity verification instruction sent by an upper-level application is received; and
collect the target fingerprint by the fingerprint recognition sensor,
wherein the identity verification instruction carries the security level of the identity verification, and different security levels for different identify verifications in different application scenes exist for the same upper-level application within an operating system.

8. The device according to claim 7, wherein the processor is further configured to:
trigger a fingerprint recognition sensor when a preset system event is detected; and
collect the target fingerprint by the fingerprint recognition sensor, the target fingerprint being used for the identity verification triggered by the detected system event.

9. The device according to claim 8, wherein the processor is further configured to:
receive security levels for identity verifications triggered by respective system events;
store a relationship between the system events and the security levels,
wherein, the processor is further configured to:
determine the security level corresponding to the detected system event according to the relationship; and
acquire the fingerprint verification rule corresponding to the security level.

10. The device according to claim 7, wherein the processor is further configured to:
calculate a score value of feature comparison between the target fingerprint and the corresponding legal fingerprint;
judge whether the score value is greater than a verifying threshold corresponding to the fingerprint verification rule; and
determine that the target fingerprint is verified if the score value is greater than the verifying threshold value.

11. The device according to claim 10, wherein the processor is further configured to:
judge whether the score value is equal to the verifying threshold; and
determine that the target fingerprint is verified, if the score value is equal to the verifying threshold value.

12. The device according to claim 10, wherein the processor is further configured to:
judge whether the fingerprint verification rule includes a fingerprint identification; and
calculate the score value between the target fingerprint and the legal fingerprint corresponding to the fingerprint identification, if the fingerprint verification rule includes the fingerprint identification.

13. A non-transitory computer-readable storage medium having stored therein instructions that, when executed by a processor of a terminal, cause the terminal to perform a method for identity verification, the method comprising:
collecting a target fingerprint of a user for the identity verification;
acquiring a fingerprint verification rule corresponding to a security level of the identity verification;
performing a verification of the target fingerprint based on the fingerprint verification rule, by comparing the target fingerprint with a corresponding legal fingerprint among a plurality of different legal fingerprints of the user, wherein each of the plurality of different legal fingerprints corresponds to a respective security level of the identity verification; and
confirming that the identity verification is successful when the target fingerprint is verified,
wherein collecting the target fingerprint comprises:
triggering a fingerprint recognition sensor when an identity verification instruction sent by an upper-level application is received; and
collecting the target fingerprint by the fingerprint recognition sensor,
wherein the identity verification instruction carries the security level of the identity verification, and different security levels for different identify verifications in different application scenes exist for the same upper-level application within an operating system.

* * * * *